United States Patent
Szabó et al.

(10) Patent No.: US 8,737,204 B2
(45) Date of Patent: May 27, 2014

(54) CREATING AND USING MULTIPLE PACKET TRAFFIC PROFILING MODELS TO PROFILE PACKET FLOWS

(75) Inventors: Géza Szabó, Kecskement (HU); Gergely Pongrácz, Budapest (HU); Djamel Sadok, Jaboatão dos Guararapes (BR); Zoltán Richárd Turányi, Szentendre (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 445 days.

(21) Appl. No.: 13/098,944

(22) Filed: May 2, 2011

(65) Prior Publication Data

US 2012/0281590 A1 Nov. 8, 2012

(51) Int. Cl.
*H04L 12/26* (2006.01)
(52) U.S. Cl.
USPC ............ 370/229; 370/253; 370/401; 709/238
(58) Field of Classification Search
None
See application file for complete search history.

(56) References Cited

U.S. PATENT DOCUMENTS

| | | | |
|---|---|---|---|
| 6,937,561 B2 * | 8/2005 | Chiussi et al. | 370/229 |
| 7,225,271 B1 | 5/2007 | DiBiasio et al. | |
| 7,594,260 B2 | 9/2009 | Porras et al. | |
| 7,664,048 B1 | 2/2010 | Yung et al. | |
| 7,702,806 B2 | 4/2010 | Gil et al. | |
| 7,891,001 B1 * | 2/2011 | Greenawalt et al. | 726/22 |
| 2003/0009585 A1 * | 1/2003 | Antoine et al. | 709/238 |
| 2007/0070901 A1 | 3/2007 | Aloni et al. | |
| 2008/0198759 A1 | 8/2008 | Harmel et al. | |
| 2009/0106839 A1 | 4/2009 | Cha et al. | |
| 2009/0138420 A1 | 5/2009 | Swift et al. | |
| 2010/0014420 A1 | 1/2010 | Wang et al. | |
| 2010/0034102 A1 | 2/2010 | Wang et al. | |
| 2010/0071061 A1 | 3/2010 | Crovella et al. | |

(Continued)

FOREIGN PATENT DOCUMENTS

| | | |
|---|---|---|
| CN | 101594303 | 2/2009 |
| WO | 2008/067758 A1 | 12/2008 |

OTHER PUBLICATIONS

European Communication and Partial European Search Report mailed Aug. 1, 2012 in EP Application No. 12002203.3.

(Continued)

*Primary Examiner* — Chi Pham
*Assistant Examiner* — Shick Hom
(74) *Attorney, Agent, or Firm* — Nixon & Vanderhye, P.C.

(57) ABSTRACT

Multiple packet traffic profiling models are created from known packet traffic flows that are labeled, where a label is an actual value of a factor influencing one or more characteristics of the known packet traffic flow. Features, which are different from the factors, are measured for each flow. Flow clusters are defined from the labeled traffic flows by processing their features and labels. The profiling models are created based on cluster information. When an unknown packet flow is received, the multiple packet traffic profiling models are evaluated according to a confidence and a completeness associated with each of the packet traffic profiling models. The packet traffic profiling model with a predetermined confidence and completeness is selected and applied to profile the unknown packet traffic flow.

31 Claims, 8 Drawing Sheets

(56) References Cited

U.S. PATENT DOCUMENTS

| | | | |
|---|---|---|---|
| 2010/0284274 | A1 | 11/2010 | Ghanadan et al. |
| 2011/0019574 | A1 | 1/2011 | Malomsoky et al. |
| 2011/0040706 | A1 | 2/2011 | Sen et al. |
| 2011/0305138 | A1 | 12/2011 | Huomo et al. |
| 2012/0278890 | A1* | 11/2012 | Maatta et al. ............... 726/23 |
| 2013/0100849 | A1* | 4/2013 | Szabo et al. ............... 370/253 |

OTHER PUBLICATIONS

Chaudhary et al., "Flow Classification Using Clustering and Association Rule Mining", 15th IEEE International Workshop on Computer Aided Modeling, Analysis and Design of Communication Links and Networks (CAMAD), Dec. 3, 2010, pp. 76-80, XP031848680.

Garcia et al., "Measuring and Profiling IP Traffic", Fourth European Conference on Universal Multiservice Networks (ECUMN'07), Feb. 1, 2007, pp. 283-291, XP031052675.

Kuai et al., "A Real-time Network Traffic Profiling System", 37th Annual IEEE/IFIP International Conference Dependable Systems and Networks (DSN'07), pp. 595-605.

Bernaille et al., Traffic Classification on the Fly, LIP6, ACM SIGCOMM Computer Communication Review, vol. 36, Issue 2, Apr. 2006, 4 pages.

Bar-Yanai et al., Realtime Classification for Encrypted Traffic, P. Festa (Ed.): SEA 2010, LNCS 6049, pp. 373-385.

Office Action dated Feb. 24, 2014 in U.S. Appl. No. 13/315,037 (45 pages).

Office Action dated Aug. 1, 2013 in U.S. Appl. No. 13/315,037 (24 pages).

U.S. Appl. U.S. Appl. No. 13/277,735, filed Oct. 20, 2011; Inventor: Szabo et al.

A. W. Moore and D. Zuev, "Internet Traffic Classification Using Bayesian Analysis Techniques," in Proc. SIGMETRICS, Banff, Alberta, Canada, Jun. 2005.

A. W. Moore, Q. Mary, D. Zuev and M. L. Crogan, "Discriminators for use in flowbased classification," Tech. Rep., Mar. 2005.

J. H. Plasberg and W. B. Kleijn, "Feature selection under a complexity constraint," Trans. Multi., vol. 11, No. 3, pp. 565-571, 2009.

M. Pietrzyk, J.-L. Costeux, G. Urvoy-Keller, and T. En-Najjary, "Challenging statistical classification for operational usage: the adsl case," in IMC '09: Proceedings of the 9th ACM SIGCOMM conference on Internet measurement conference. New York, NY, USA: ACM, 2009, pp. 122-135.

Sean Borman: The Expectation Maximization Algorithm http://www.seanborman.com/publications/EM_algorithm.pdf, Jul. 18, 2004.

J.P.Lewis: A Short SVM (Support Vector Machine) Tutorial http://scribblethink.org/Work/Notes/svmtutorial.pdf, Dec. 2004.

U.S. Appl. No. 13/315,037, filed Dec. 8, 2011; Inventor: Szabo et al.

Office Action dated Jan. 10, 2014 in U.S. Appl. No. 13/277,735 (17 pages).

* cited by examiner

| Flow ID | Features | | | | Test result | | |
|---|---|---|---|---|---|---|---|
| | avg IAT | psize dev | sum byte | time len | Label | Classification | Clustering (hard) | Clustering (soft) |
| 1 | 35 | 10 | 61 | 35 | P2P | P2P | 1 | 1(80%), 2(15%) |
| 2 | 77 | 37 | 87 | 9 | P2P | P2P | 1 | 1(75%), 3(10%) |
| 3 | 80 | 46 | 58 | 38 | E-mail | P2P | 2 | 2(95%) |
| 4 | 66 | 0 | 79 | 51 | VoIP | VoIP | 3 | 3(45%), 2(9%) |

| | Features | | | | Label | | | | | Constructed labels | | |
|---|---|---|---|---|---|---|---|---|---|---|---|---|
| | | | | | | | | | | | Model | |
| Flow ID | avg IAT | psize dev | sum byte | time len | Application client | Protocol | User activity | Terminal type | Network conditions | 3.1 | 3.2 | 4.4 |
| 1 | 78 | 51 | 77 | 98 | uTorrent | BitTorrent | File-sharing | DSL | P2P | uTorrent.BitTorrent. File-sharing | uTorrent.BitTorrent. P2P | uTorrent.File-sharing. DSL.P2P |
| 2 | 51 | 54 | 11 | 0 | Azureus | BitTorrent | File-sharing | FTTH | P2P | Azureus.BitTorrent. File-sharing | Azureus.BitTorrent. P2P | Azureus.File-sharing. FTTH.P2P |
| 3 | 51 | 60 | 75 | 57 | MSOutlook | POP3 | E-mail | WiFi | ? | MSOutlook. POP3.E-mail | MSOutlook.POP3.? | MSOutlook.E-mail. WiFi.? |
| 4 | 58 | 11 | 40 | 54 | Skype | Skype | VoIP | Smart-phone | P2P | Skype.Skype.VoIP | Skype.Skype.P2P | Skype.VoIP.Smartphone. P2P |
| 5 | 63 | 28 | 53 | 10 | ? | DNS | ? | PC/handheld | ? | ?.DNS.? | ?.DNS.? | ?.?.PC/handheld.? |
| 6 | 41 | 76 | 88 | 7 | Skype | ? | File-sharing | DSL | P2P | Skype.?.File-sharing | Skype.?.P2P | Skype.File-sharing. DSL.P2P |
| 7 | 62 | 75 | 84 | 10 | iExplorer | HTTP | ? | DSL | Youtube-CDN | iExplorer.HTTP.? | iExplorer.HTTP. Youtube-CDN | iExplorer.?.DSL. Youtube-CDN |

CREATING AND USING MULTIPLE PACKET TRAFFIC PROFILING MODELS TO PROFILE PACKET FLOWS

TECHNICAL FIELD

The technology relates to packet traffic profiling.

BACKGROUND

Efficient allocation of network resources, such as available network bandwidth, has become critical as enterprises increase reliance on distributed computing environments and wide area computer networks to accomplish critical tasks. Transport Control Protocol (TCP)/Internet Protocol (IP) protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

Bandwidth management in TCP/IP networks to allocate available bandwidth from a single logical link to network flows is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management including some partitioning and prioritizing of separate traffic classes. However, configuring these queuing options with any precision or without side effects is in fact very difficult, and in some cases, not possible.

Bandwidth management devices allow for explicit data rate control for flows associated with a particular traffic classification. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions to ensure a minimum bandwidth and/or cap bandwidth as to a particular class of traffic. After identification of a traffic type corresponding to a data flow, a bandwidth management device associates and subsequently applies bandwidth utilization controls (e.g., a policy or partition) to the data flow corresponding to the identified traffic classification or type.

More generally, in-depth understanding of a packet traffic flow's profile is a challenging task and a requirement for many Internet Service Providers (ISP). Deep Packet Inspection (DPI) may be used to perform such profiling to allow ISPs to apply different charging policies, perform traffic shaping, and offer different quality of service (QoS) guarantees to selected users or applications. Many critical network services may rely on the inspection of packet payload content, but there can be use cases when only looking at the structured information found in packet headers is feasible.

Traffic classification systems include a training phase and a testing phase during which traffic is actually classified based on the information acquired in the training phase. Unfortunately, in existing packet header-based traffic classification systems, the effects of network environment changes and the characteristic features of specific communications protocols are not identified and then considered together. But because each change and characteristic feature affects one or more of the other changes and characteristic features, the failure consider them together along with respective interdependencies results in reduced accuracy when testing traffic a different network than was used the training phase was using.

SUMMARY

Multiple packet traffic profiling models are created in a model training operation from known packet traffic flows that are labeled, where a label is an actual value of a factor influencing one or more characteristics of the known packet traffic flow. Features, which are different from the factors, are measured for each flow. Flow clusters are defined from the labeled traffic flows by processing their features and labels. Each flow cluster may have a corresponding cluster definition. The profiling models are created based on cluster information like the cluster definitions. The created traffic models are stored in memory.

Non-limiting example factors include one or more of the following: an application that generated the packet traffic flow, a communications protocol associated with the packet traffic flow, a user activity associated with the packet traffic flow, a type of user terminal involved in transmitting the packet traffic flow, and one or more conditions of a packet communications network over which the packet traffic flow is transported. Non-limiting example features for a packet traffic flow include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes a number of transported packets for a packet traffic flow until a first packet direction change, or a statistically-filtered time series relate this to a packet traffic flow.

In a non-limiting example implementation related to model creation (training), the label is identified by deep packet inspection.

In another non-limiting example alternative related to training, each flow cluster is based on labels of a single factor. In another non-limiting example alternative, each flow cluster is based on a combination of labels of two or more factors.

Later, when an unknown packet flow is received in a traffic flow profiling operation, the multiple packet traffic profiling models are evaluated according to a confidence and a completeness associated with each of the packet traffic profiling models. The packet traffic profiling model with a predetermined confidence and completeness is selected and applied to profile the unknown packet traffic flow. Each of the packet traffic profiling models is based on flow clusters previously-defined from known packet traffic flows by processing measured features and labels related to each of those known packet traffic flows. The confidence may include an accuracy of a packet traffic profiling model and the completeness a level or degree of detail of the packet traffic profiling model.

In a non-limiting example implementation related to profiling, the evaluating of multiple packet traffic profiling models includes using a deep packet inspection process.

In another non-limiting example implementation related to profiling, the evaluating of multiple packet traffic profiling models includes using an expert system. For example, the expert system may use Dempster-Shafer decision making processing.

In yet another non-limiting example implementation related to profiling, selecting a packet traffic profiling model from the evaluated packet traffic profiling models with the predetermined confidence and completeness includes taking into account in the selection feedback information of models validated by a deep packet inspection process.

In another non-limiting example implementation related to profiling, selecting a packet traffic profiling model from the evaluated packet traffic profiling models with the predetermined confidence and completeness includes taking into account a correlation of an output of each of the evaluated packet traffic profiling models.

The technology may be implemented in or connected to one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not obscure the description with unnecessary detail. Individual blocks may are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology described in this case may be applied to any communications system and/or network. A network device, e.g., a hub, switch, router, and/or a variety of combinations of such devices implementing a LAN or WAN, interconnects two other end nodes such as a client device and a server. The network device may include a traffic monitoring module connected to a part of a communications path between the client device and the server to monitor one or more packet traffic flows. The network device may also include a training module for generating multiple packet traffic flow models used by the traffic monitoring module. Alternatively, the training module may be provided in a separate node from the network device, and the multiple packet traffic flow models are in that case provided to the traffic monitoring module. In one example embodiment, the training module and the traffic monitoring module each employ a combination of hardware and software, such as a central processing unit, memory, a system bus, an operating system and one or more software modules implementing the functionality described herein. The functionality of traffic monitoring device 30 can be integrated into a variety of network devices that classify network traffic, such as firewalls, gateways, proxies, packet capture devices, network traffic monitoring and/or bandwidth management devices, that are typically located at strategic points in computer networks.

Figure 1:
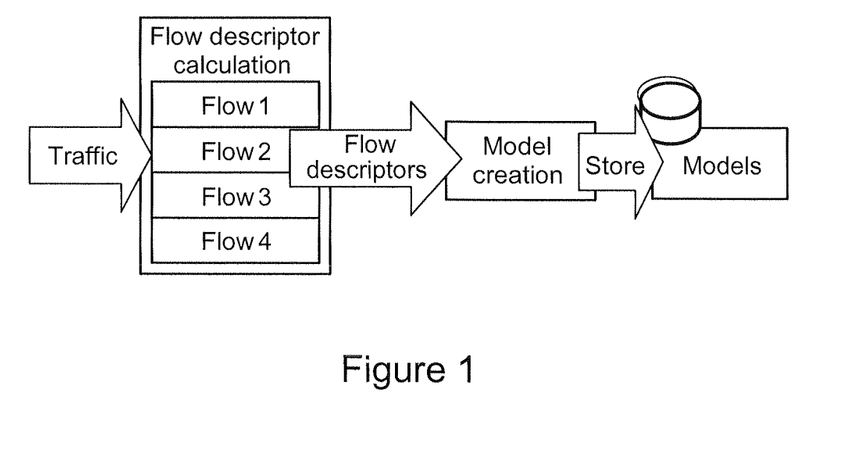
FIG. 1 is diagram of a training operation to create multiple packet traffic flow models.

FIG. 1 is diagram of a training operation to create multiple packet traffic flow models. The input of the training phase includes known packet traffic flows, and the output includes multiple packet traffic flow models. Packet traffic flow descriptors like average payload size, etc. (described in more detail below) are determined from the known packet traffic flows and used to generate clusters which are used to create the multiple packet traffic flow models. The models are stored for later use to profile unknown packet traffic flows.

Figure 2:
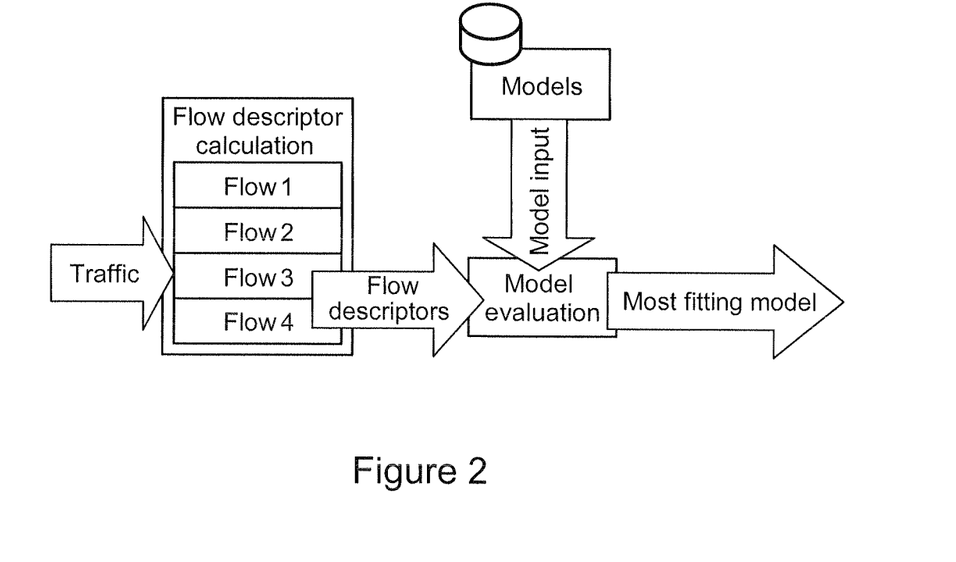
FIG. 2 is diagram of packet traffic flow profiling using multiple packet traffic flow models created in FIG. 1.

FIG. 2 is diagram of packet traffic flow profiling using multiple packet traffic flow models created in FIG. 1. Unknown packet traffic flows are received and processed to determine multiple flow descriptors (in a similar way as in the training phase) with a particular accuracy and confidence level. The multiple packet traffic flow models created in the training phase are loaded and tested on the input data, and the one of them is selected to profile a particular one of the unknown traffic flows.

Figure 3:
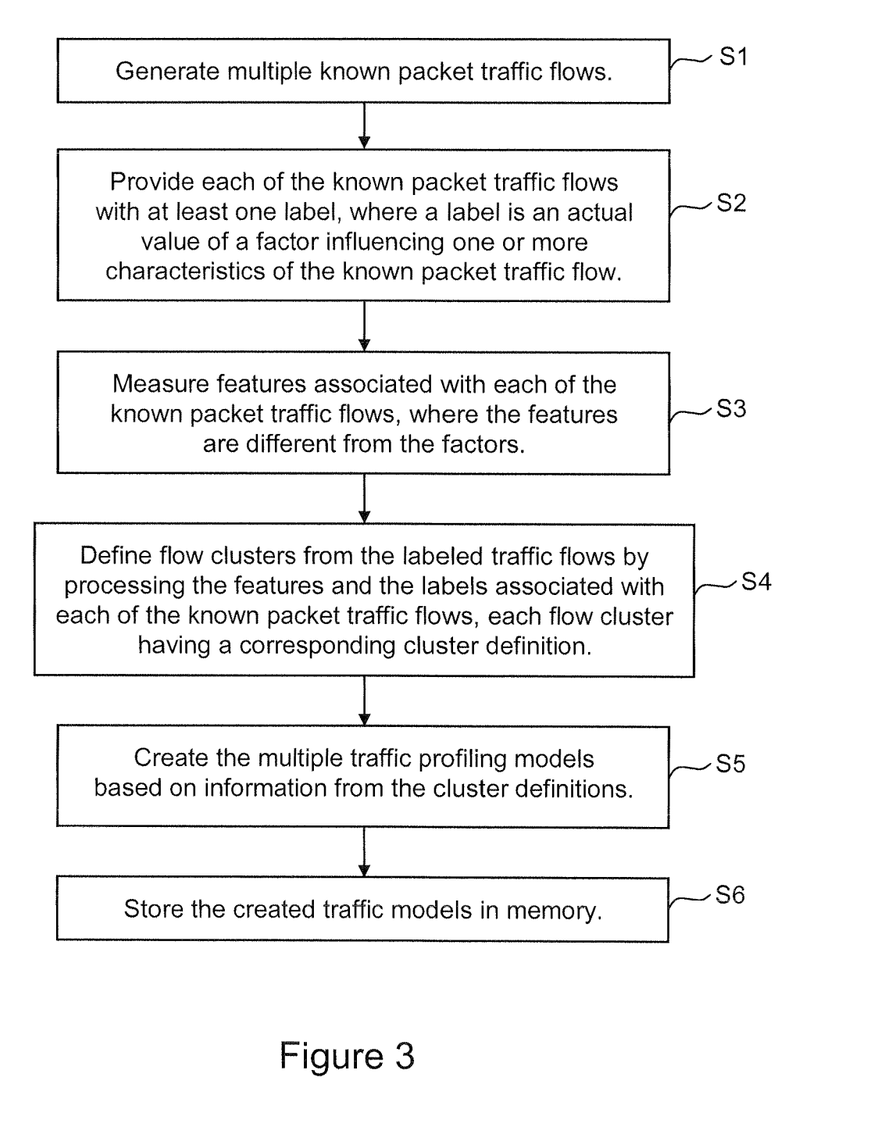
FIG. 3 is a non-limiting flowchart illustrating example procedures for creating multiple packet traffic flow models.

FIG. 3 is a non-limiting flowchart titled Model Generation illustrating example procedures for creating multiple packet traffic flow models. Initially, multiple known packet traffic flows are generated or received (step S1). Each of the known packet traffic flows is provided with at least one label (step S2). A label is an actual value of a factor that influences one or more characteristics of the known packet traffic flow. A monitoring device measures features associated with each of the known packet traffic flows (step S3). The features are different from the factors. Flow clusters are then defined from the labeled traffic flows by processing the features and the labels associated with each of the known packet traffic flows (step S4). Each flow cluster has a corresponding cluster definition. Multiple traffic profiling models are created based on information from the cluster definitions (step S5), and the created traffic models are preferably stored in memory (step S6).

Figure 4:
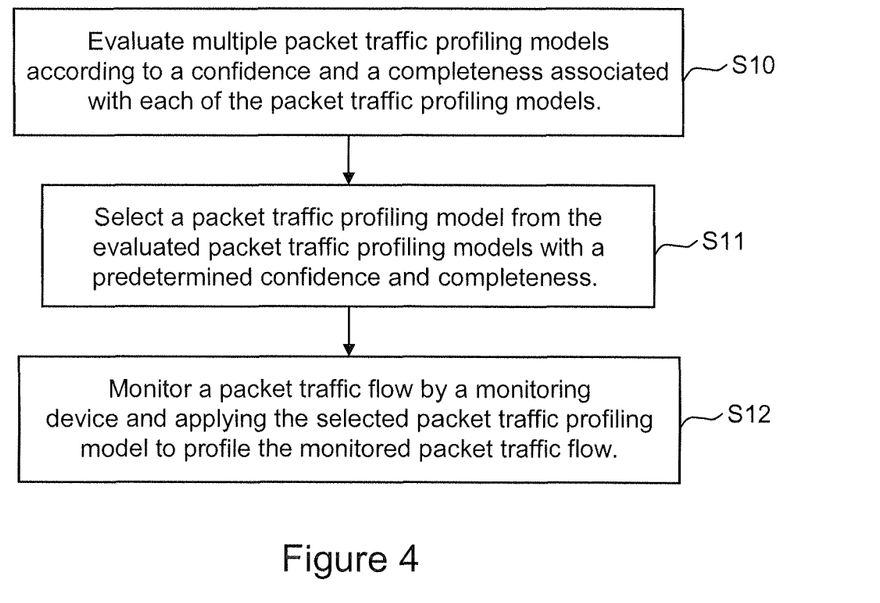
FIG. 4 is a non-limiting flowchart illustrating example procedures for packet traffic flow profiling using multiple packet traffic flow models.

FIG. 4 is a non-limiting flowchart entitled Packet Traffic Flow Profiler illustrating example procedures for packet traffic flow profiling using multiple packet traffic flow models such as those created in FIG. 3. Multiple, previously-created packet traffic profiling models are evaluated according to a confidence and a completeness associated with each of the packet traffic profiling models (step S10). A packet traffic profiling model is selected from the evaluated packet traffic profiling models with a predetermined confidence and completeness (step S11). A monitoring device identifies a packet traffic flow to which the selected packet traffic profiling model is applied to profile the monitored packet traffic flow (step S12).

Figure 5:
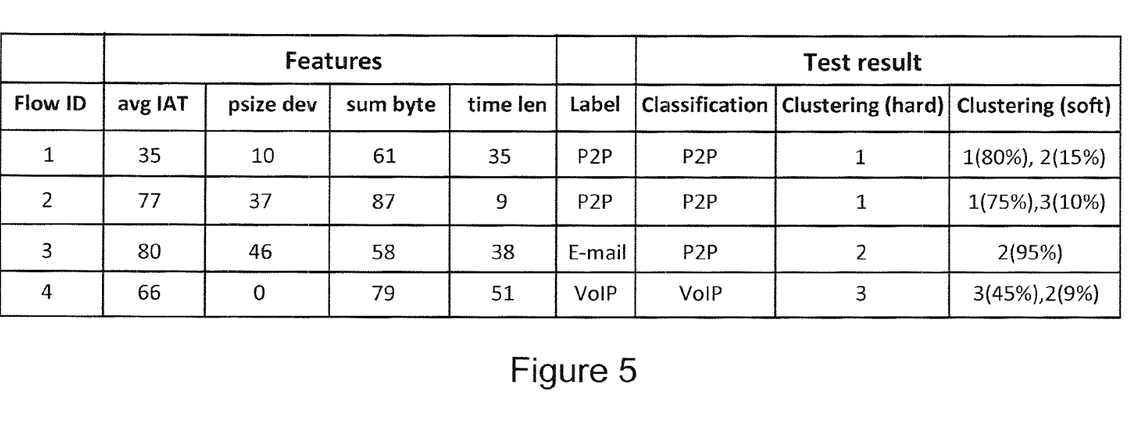
FIG. 5 is a non-limiting, example of multiple packet traffic flows with example features, labels, classifications, and clusterings.

FIG. 5 is a non-limiting, example of multiple packet traffic flows with example features, labels, classifications, and clusterings. Each of the four example flows has a flow identifier, assigned features, and a label for a factor. Non-limiting example features for a packet traffic flow include one or more of: average packet inter-arrival time for a packet traffic flow (avg IAT), packet size deviation (psize clev) in a packet traffic flow, sum of bytes (sum byte) in a flow, time duration (time len) of a packet traffic flow. Non-limiting example factors include: an application that generated the packet traffic flow, a communications protocol associated with the packet traffic flow, a user activity associated with the packet traffic flow, a type of user terminal involved in transmitting the packet traffic flow, and one or more conditions of a packet communications network over which the packet traffic flow is transported. FIG. 5 shows labels for a factor. The test results for the traffic profiling of these flows is a traffic flow classification (e.g., point-to-point (P2P) and voice over IP (VoIP)), a hard clustering result (e.g., 1, 2, or 3 with each number corresponding to a specific cluster), and a soft clustering result where the result is associated with a confidence value, (e.g., a certainty percentage). The test results show that flows 1, 2, and 4 are profiled correctly because the label for the flow matches its classification. On the other hand, the label for flow 3, email, differs from its classification of P2P.

Figure 6A:
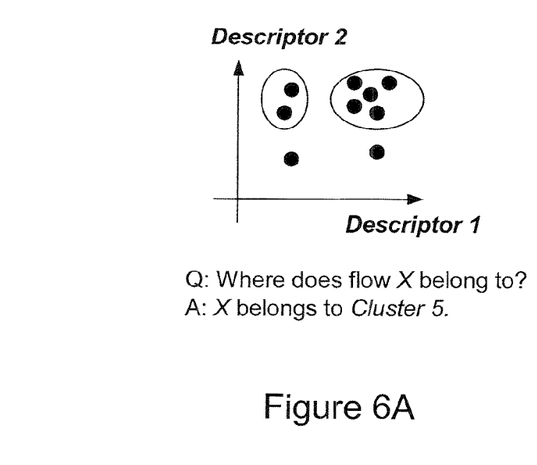
FIGS. 6A and 6B provide example illustrations of clustering and classification.
Figure 6B:
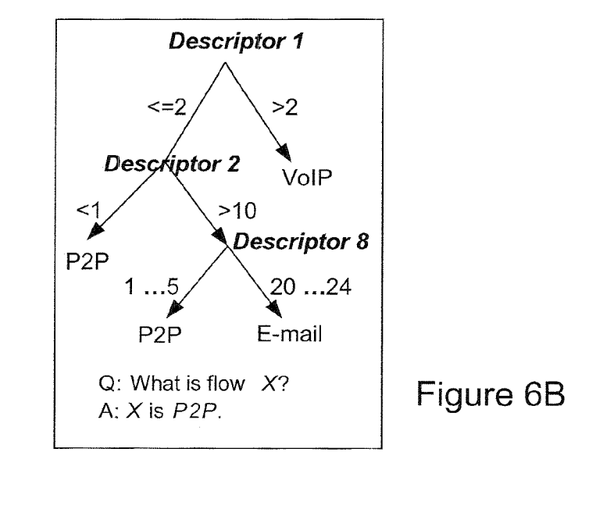

FIG. 6A provides an example illustration of clustering which is unsupervised learning where only features are considered. The circled areas represent clusters of points where traffic flow descriptors 1 and 2 intersect. One cluster includes two points and the other five points. FIG. 6B provides an example illustration of classification which is supervised learning where both features and labels are considered. The classification process is carried out using a decision tree in which several decisions are made on the descriptors (features and labels) of the flow. At the end of the decision tree process, the flow is identified/classified.

The inventors recognized that multiple different factors influence the characteristics of a packet traffic flow such as the particular computer application that generated the packet traffic flow, the communications protocol that the application uses for the packet traffic flow, the functional intention of the user associated with the packet traffic flow, the user terminal and its access type, and/or the network topology, distance, etc. These five factors are examples only and other factors may be useful. But for purposes of illustration for the following description, these five factors are used.

Figure 9:
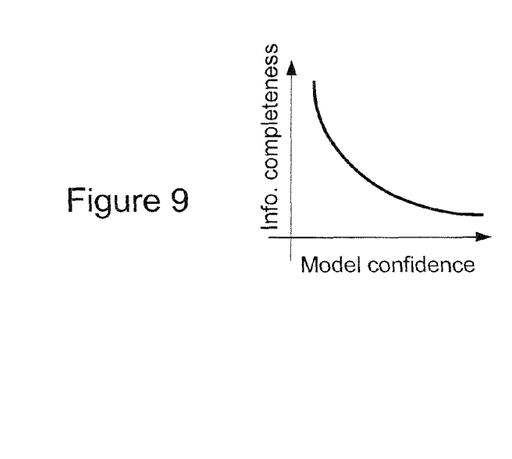
FIG. 9 is a graph illustrating a relationship between the model information completeness and model confidence.

The inventors also recognized that some or all of the factors are often somewhat correlated and in many-to-many relations where any of the factors may be correlated with any of the other factors. The relationships between the multiple factors are determined by creating multiple packet traffic flow models. But there is a possible trade-off in that the more complete the information known about these five factors, the less confidence there is associated with the models because of a decrease in sample size and the greater likelihood of overfitting. As illustrated in FIG. 9, the more complete the model information, the less samples in a cluster. The fewer the number of samples, the less confident is the model. In an extreme case no samples are in the cluster which corresponds to overfitting. Alternatively, just the basic factors could be used and the relationships among them may be trained into a classification model. An advantage with this latter approach is lower calculation complexity.

Figure 7:
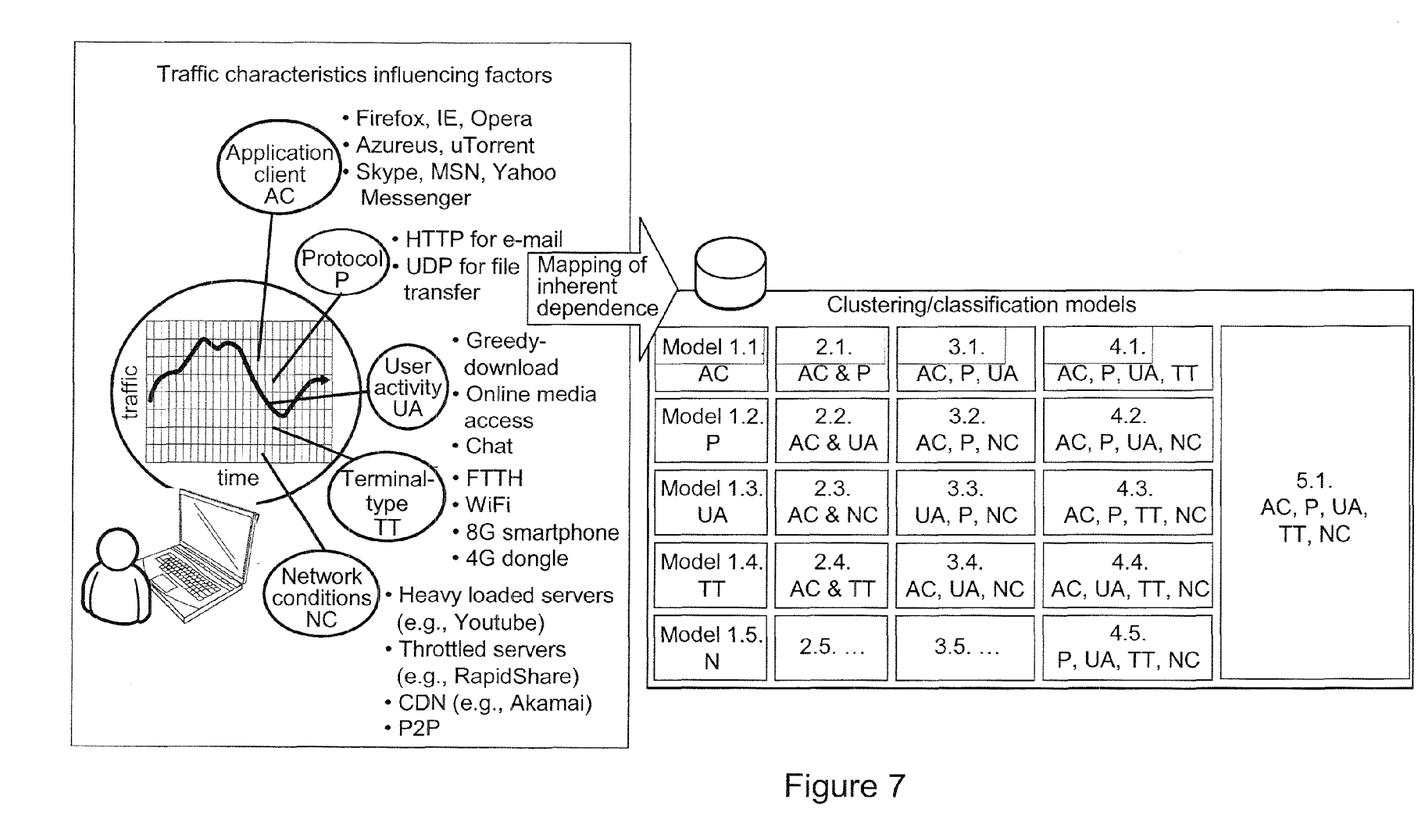
FIG. 7 is a non-limiting, example function block diagram of a trainer unit performing the functions outlined in FIG. 3.

FIG. 7 is a non-limiting, example of traffic characteristic influencing factors being used to create multiple packet traffic flow clustering/classification models. Five non-limiting example factors are shown on the left. Other and/or additional factors may be used. Examples of the application factor include Firefox, Internet Explorer, Opera, Azureus, uTorrent, Skype, MSN, Yahoo Messenger, etc. Examples of the protocol factor include HTTP for email, UDP for file transfer, etc. Examples for the user activity factor include greedy-download, online media access, chat, etc. Examples of the user terminal type factor include FTTH, WiFi, 3G smartphone, 4G dongle, etc. Examples of the network conditions factor include heavy loaded servers (e.g., Youtube), throttled servers (e.g. RapidShare), content delivery network (CDN) (e.g., Akamai), P2P, etc. Each combination of the factors defines a model. For example, model 3.1 is a combination of factors 'application client', 'protocol' and 'user activity'. Assuming five factors, the numbers of models are as follows: model 1.1-1.5 (using only one factor), model 2.1-2.10 (combining two factors), model 3.1-3.10 (combining three factors), model 4.1-4.5 (combining four factors) and model 5.1 (combining five factors). For sake of simplicity models 2.6-2.10 and models 3.6-3.10 are not illustrated in the figure. Multidimensional label information (a label is an actual value of one of the five factors) is determined. Usually the first factor is not known, while the other four factors may be known.

Figure 8:
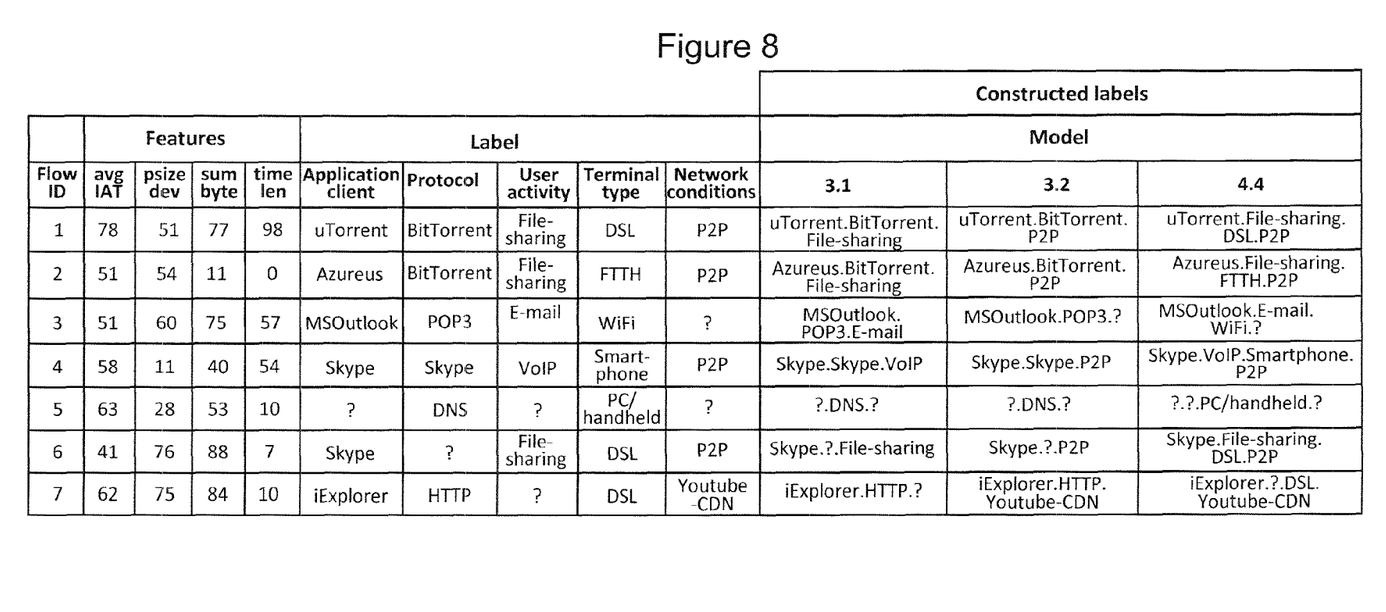
FIG. 8 is a non-limiting, example of traffic characteristic influencing factors being mapped to clustering/classification models.

FIG. 8 shows a non-limiting, example of multiple packet traffic flows 1-7 with example features and labels determined from known input packet traffic flows. Each of the models in FIG. 7 is constructed from those flows in FIG. 8 which have all of the features and label fields filled in. Example clustering/classification models 1.1-5.1 are also shown in FIG. 8. The input for each of the models is a feature set and a constructed label set of one or more factors for that model. Each model determines a clustering (like FIG. 6A) or classification (like FIG. 6B) for a combination of features and factor labels. For example, model 3.1 determines the clustering/classification for traffic flow 1 using the features of flow 1 applied to the label 'uTorrent' for factor 'Application client', the label 'BitTorrent' for factor 'Protocol', and the label 'File sharing' for factor 'User Activity'. Flows with labels missing a field value are omitted from the training set. This means that flows 3 and 5-7 are omitted from the training set (see the "?" marks in FIG. 8). As a result, increasing the number of feature and/or label fields may mean that the size of training data may actually decrease. For example, in the case of model 3.1, the features of avg IAT, psize dev, sum byte, and time len combined with the factors of 'application client', 'protocol', and 'user activity', respectively are evaluated. The labels 'uTorrent', 'BitTorrent', and 'File-sharing' are constructed from flow 1, the labels of 'Azureus', 'BitTorrent', and 'File-sharing' are constructed from flow 2, etc. In the training phase, different labels are identified to the same model from each flow. The selection of the best model is carried out in the profiling (testing) phase.

Figure 10:
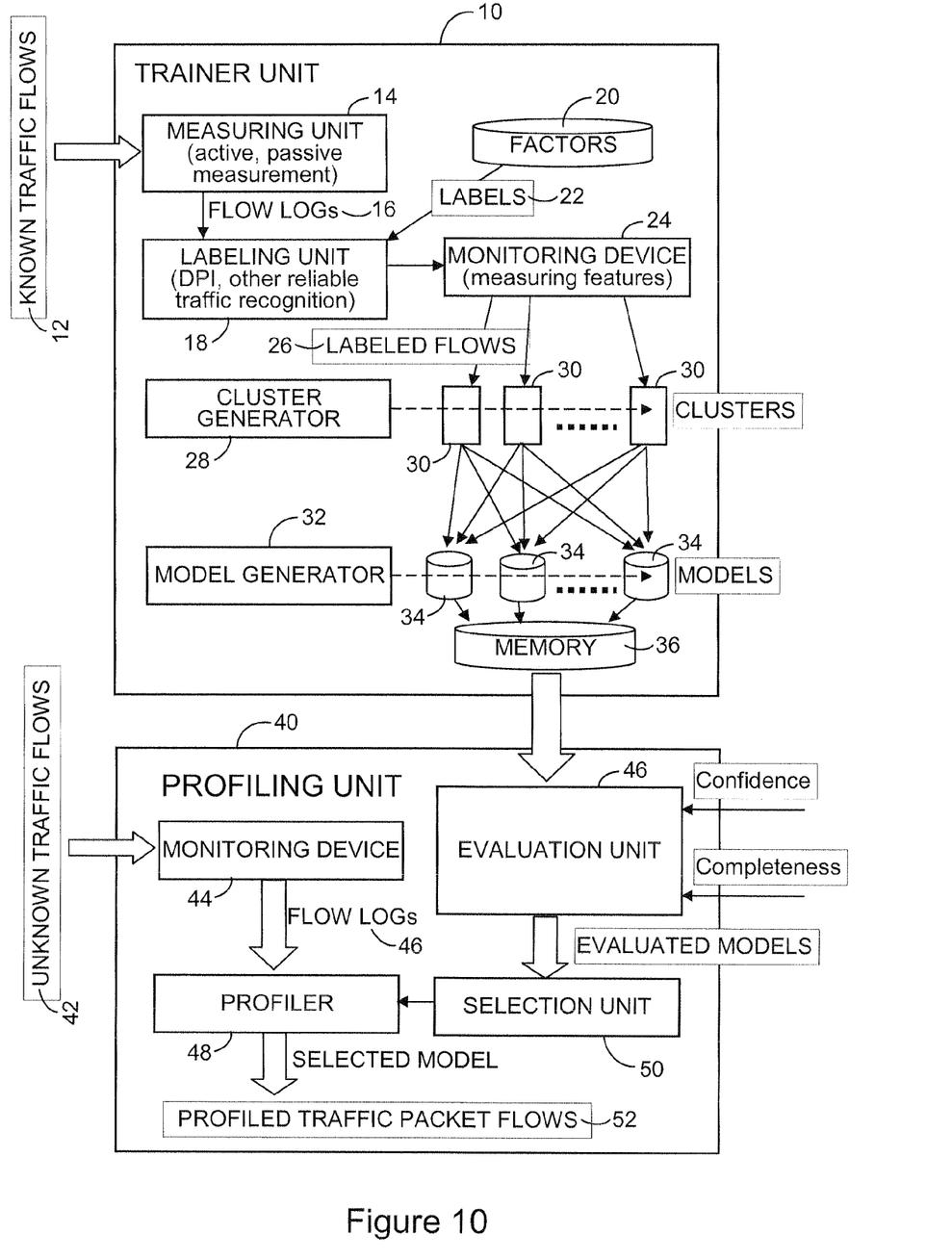
FIG. 10 is a non-limiting, example of apparatus for training and/or profiling multiple packet traffic flows with example features, labels, and models.

FIG. 10 is a non-limiting, example function block diagram of a trainer unit and profiling unit for performing the packet traffic flow model creation and packet traffic flow profiling functions outlined in FIGS. 3 and 4. Known packet traffic flows 12 are provided to/received at a trainer unit or module 10 at a measuring unit 14, which may perform passive and/or active measurement functions to create flow logs 16, each flow log comprising a flow furnished with a flow identifier. A labeling processor 18 receives the flow logs 16 and performs deep packet inspection of the flows or other reliable traffic recognition analysis to apply labels (actual values of the factors stored in memory 20, e.g., application, protocol, user activity, terminal type, and network condition) that match the inspected packets of each packet traffic flow. The labeling processor 18 provides the labeled flows 26 to a monitoring device that measures the features (e.g., avg IAT, psize dev, sum byte, time len, etc.) and provides the labeled and featured flows to a cluster processor 28 that analyzes the flows to generate multiple clusters 30, where each cluster 30 has a corresponding cluster definition, e.g., like the definition shown in FIG. 6A or 6B. A model generating processor 32 generates multiple packet traffic flow models 34 based on the clusters 30 and stores them in memory 36.

A profiling unit or module 40 receives unknown traffic flows at a monitoring device 44 which generates packet traffic flow logs 46. The profiling unit 40 may be in the same node or a different node as the trainer unit 10. An evaluation processor 46 evaluates the multiple traffic flow models 34 provided by the trainer unit 12 based on confidence and completeness criteria. The calculation of confidence and completeness vary for different machine learning algorithms. The evaluation processor 46 may, in a preferred example embodiment, employ an expert system to perform the model evaluation. An example expert system may be based on the well known Dempster-Shafer (D-S) decision making that assigns its degree of confidence to all of the non-empty models. The model evaluation information is provided to a selection processor 50 which selects a best model for profiling each of the unknown packet traffic flows. The selection is based on the comparison of the confidence generated by the expert system and the confidence of the machine learning algorithm together with the completeness. A profiling processor 48 profiles each of the unknown packet traffic flows using the model that is provided by the selection processor 50 and provides the profiled traffic packet flows 52 by identifying the most probable application for the inspected flow.

Since packet traffic flow models are built per application, there overlapping clusters may result. For example, a packet traffic flow may be identified with an FTP cluster with a probability of 0.9 as well as identified with a P2P cluster with a probability of 0.8. As a result, one cannot conclude that the flow was generated by FTP. Given that the two probabilities are conditional, the Bayes theorem may be used to determine an appropriate probability. Let $\{C_{a,i}\}_{a \in A, i \in I}$ be the set of clusters, where cluster $C_{a,i}$ is the i-th cluster in the clustering of application $\alpha$ and let x be a given flow to be identified with a cluster.

$$P(C_{a,i} \mid x) = \frac{P(x \mid C_{a,i}) P(C_{a,i})}{P(x)},$$

where the probability $P(x|C_{a,i})$ can be computed from a conditional density function, $P(C_{a,i})$ is an a priori distribution of the clusters of application "a" and P(x) is a constant for a given packet traffic flow. Accordingly, it may be determined for which $\alpha \in A$ and $i \in I$, $P(C_{a,i}|x)$ has a maximum value, and from that, choose the corresponding application having the highest probability.

In another example embodiment, if the confidence is low and conflicts occur with the deep packet inspection (DPI) decision making, then the classification model may be retrained online using DPI and known again during profiling. Application mix information (a flow/volume ratio of the flows grouped according to generating application) is inherently trained as an a priori information (more P2P in traffic, more likely to judge on P2P). One example way to do this training online using an incremental approach is described in Luo Jie, Francesco Orabona, Marco Fornoni, Barbara Caputo, Nicolo Cesa-Bianchi: OM-2: An Online Multi-class Multi-kernel Learning Algorithm, http://www.idiap.ch/~jluo/publications/files/om-2.pdf.

Figure 11:
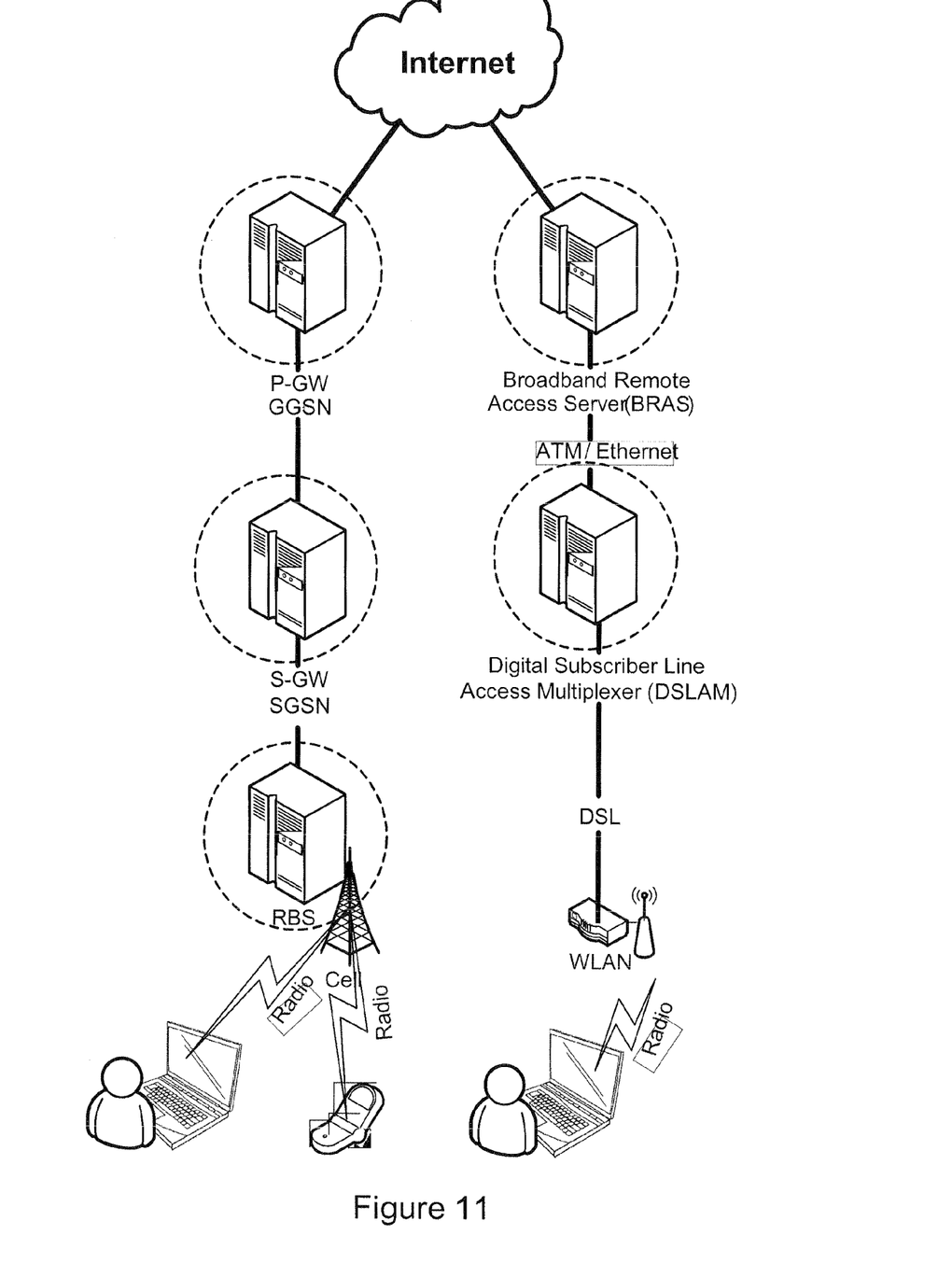
FIG. 11 is a non-limiting, example of a communications system illustrating various nodes in which the model generation and/or traffic profiling may be employed.

FIG. 11 is a non-limiting, example of a communications system illustrating various nodes in which the model generation and/or traffic profiling may be employed. The illustrated example network nodes that can support one or both of the training and profiling units may observe the packet traffic of several users and thus are circled. They include a radio base station, a Serving GPRS Support Node (SGSN), Gateway GPRS Support Node (GGSN), Broadband Remote Access Server (BRAS), or Digital Subscriber Line Access Multiplexer (DSLAM). Although also possible as an implementation node, the WLAN access point is a very low aggregation point and thus is not circled as are the other nodes. Of course, the technology may be used in other suitable network nodes.

The technology described provides complete and confident traffic profiling information determined taking into account multiple traffic influencing factors. Because the technology is based on packet header information, it can deal with encrypted traffic as well as unencrypted traffic. Moreover, the technology scales well as the different units may compute their respective results parallel making it suitable for implementation using multi-core processors. Significantly, the technology provides a data "fusion" approach that combines the confidences from multiple models to account for interrelationships and interdependencies between multiple different traffic inputs. Multiple traffic influencing factors and multiple models are considered to map non-independent factors impacting traffic flows and a best model is automatically via a recombination algorithm. An expert system, like one based on Dempster's theory, is an advantageous way to manage traffic classification with such multiple different traffic inputs. Ultimately, the multi-model concept aggregated with a collaborative profiling unit provides superior traffic classification performance.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method for creating multiple packet traffic profiling models, comprising:
    generating multiple known packet traffic flows;
    providing each of the known packet traffic flows with at least one label, where a label is an actual value of a factor influencing one or more characteristics of the known packet traffic flow;
    measuring, by a monitoring device, features associated with each of the known packet traffic flows, where the features are different from the factors;
    defining flow clusters from the labeled traffic flows by processing the features and the labels associated with each of the known packet traffic flows, each flow cluster having a corresponding cluster definition;
    creating the multiple traffic profiling models based on information from the cluster definitions; and
    storing the created traffic models in memory.

2. The method in claim 1, wherein the factors include one or more of the following: an application that generated the packet traffic flow, a communications protocol associated with the packet traffic flow, a user activity associated with the packet traffic flow, a type of user terminal involved in transmitting the packet traffic flow, and one or more conditions of a packet communications network over which the packet traffic flow is transported.

3. The method in claim 1, wherein the features for a packet traffic flow include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes a number of transported packets for a packet traffic flow until a first packet direction change, or a statistically-filtered time series relate this to a packet traffic flow.

4. The method in claim 1, wherein the label is identified by deep packet inspection.

5. The method in claim 1, wherein each flow cluster is based on labels of a single factor.

6. The method in claim 1, wherein each flow cluster is based on a combination of labels of two or more factors.

7. A method for profiling packet traffic flows, comprising:
    evaluating multiple packet traffic profiling models according to a confidence and a completeness associated with each of the packet traffic profiling models;
    selecting a packet traffic profiling model from the evaluated packet traffic profiling models with a predetermined confidence and completeness; and
    monitoring a packet traffic flow by a monitoring device and applying the selected packet traffic profiling model to profile the monitored packet traffic flow.

8. The method in claim 7, wherein each of the packet traffic profiling models is based on flow clusters previously-defined from known packet traffic flows by processing measured features and labels related to each of those known packet traffic flows, where a label is an actual value of a factor influencing one or more characteristics of a packet traffic flow and a feature is different from a factor and is associated with each packet traffic flow.

9. The method in claim 8, wherein the factors include one or more of the following: an application that generated the packet traffic flow, a communications protocol associated with the packet traffic flow, a user activity associated with the packet traffic flow, a type of user terminal involved in transmitting the packet traffic flow, and one or more conditions of a packet communications network over which the packet traffic flow is transported.

10. The method in claim 8, wherein the features for a packet traffic flow include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes a number of transported packets for a packet traffic flow until a first packet direction change, or a statistically-filtered time series relate this to a packet traffic flow.

11. The method in claim 7, wherein the confidence includes an accuracy of a packet traffic profiling model and the completeness includes a level or degree of detail of the packet traffic profiling model.

12. The method in claim 7, wherein the evaluating of multiple packet traffic profiling models includes using a deep packet inspection process.

13. The method in claim 7, wherein the evaluating of multiple packet traffic profiling models includes using an expert system.

14. The method in claim 13, wherein the expert system uses Dempster-Shafer decision making processing.

15. The method in claim 7, wherein selecting a packet traffic profiling model from the evaluated packet traffic profiling models with the predetermined confidence and completeness includes taking into account in the selection feedback information of models validated by a deep packet inspection process.

16. The method in claim 7, wherein selecting a packet traffic profiling model from the evaluated packet traffic profiling models with the predetermined confidence and completeness includes taking into account a correlation of an output of each of the evaluated packet traffic profiling models.

17. The method in claim 7, wherein the method is implemented in or connected to one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

18. An apparatus for creating multiple packet traffic profiling models based on multiple known packet traffic flows, comprising:
a receiving port for receiving the known packet traffic flows, where each know packet traffic flow is provided with at least one label, where a label is an actual value of a factor influencing one or more characteristics of the known packet traffic flow;
a measuring unit configured to measure features associated with each of the known packet traffic flows, where the features are different from the factors;
a cluster data processor configured to define flow clusters from the labeled traffic flows by processing the features and the labels associated with each of the known packet traffic flows, each flow cluster having a corresponding cluster definition;
a model data processor configured to create the multiple traffic profiling models based on information from the cluster definitions; and
a memory for storing the created traffic models.

19. The apparatus in claim 18, wherein the factors include one or more of the following: an application that generated the packet traffic flow, a communications protocol associated with the packet traffic flow, a user activity associated with the packet traffic flow, a type of user terminal involved in transmitting the packet traffic flow, and one or more conditions of a packet communications network over which the packet traffic flow is transported.

20. The apparatus in claim 18, wherein the features for a packet traffic flow include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes a number of transported packets for a packet traffic flow until a first packet direction change, or a statistically-filtered time series relate this to a packet traffic flow.

21. The apparatus in claim 18, wherein each flow cluster is based on labels of a single factor.

22. The apparatus in claim 18, wherein each flow cluster is based on a combination of labels of two or more factors.

23. An apparatus for profiling packet traffic flows, comprising:
an evaluation data processor configured to evaluate multiple packet traffic profiling models according to a confidence and a completeness associated with each of the packet traffic profiling models;
a selection unit configured to select a packet traffic profiling model from the evaluated packet traffic profiling models with a predetermined confidence and completeness; and
a monitoring device configured to monitor packet traffic flows;
a profiling data processor configured to use the selected packet traffic profiling model to profile the monitored packet traffic flow.

24. The apparatus in claim 23, wherein each of the packet traffic profiling models is based on flow clusters previously-defined from known packet traffic flows by processing measured features and labels related to each of those known packet traffic flows, where a label is an actual value of a factor influencing one or more characteristics of a packet traffic flow and a feature is different from a factor and is associated with each packet traffic flow.

25. The apparatus in claim 24, wherein the factors include one or more of the following: an application that generated the packet traffic flow, a communications protocol associated with the packet traffic flow, a user activity associated with the packet traffic flow, a type of user terminal involved in transmitting the packet traffic flow, and one or more conditions of a packet communications network over which the packet traffic flow is transported.

26. The apparatus in claim 25, wherein the features for a packet traffic flow include one or more of: average packet inter-arrival time for a packet traffic flow, packet size deviation in a packet traffic flow, sum of bytes in a flow, time duration of a packet traffic flow, TCP flags set in a packet traffic flow, packet direction in a packet traffic flow, a number of packet direction changes a number of transported packets for a packet traffic flow until a first packet direction change, or a statistically-filtered time series relate this to a packet traffic flow.

27. The apparatus in claim 23, wherein the confidence includes an accuracy of a packet traffic profiling model and the completeness includes a level or degree of detail of the packet traffic profiling model.

28. The apparatus in claim 23, wherein the evaluation data processor includes an expert system.

29. The apparatus in claim 23, wherein the selection unit is configured to select a packet traffic profiling model based on feedback information of a deep packet inspection process of a monitored packet traffic flow.

30. The apparatus in claim 23, wherein the selection unit is configured to select a packet traffic profiling model based on a correlation of an output of each of the evaluated packet traffic profiling models.

31. The apparatus in claim 23, implemented in or connected to one or more of the following: a radio base station, a Serving GPRS Support Node (SGSN), Gateway GPRS Support Node (GGSN), Broadband Remote Access Server (BRAS), or Digital Subscriber Line Access Multiplexer (DSLAM).

* * * * *

UNITED STATES PATENT AND TRADEMARK OFFICE
CERTIFICATE OF CORRECTION

PATENT NO. : 8,737,204 B2  
APPLICATION NO. : 13/098944  
DATED : May 27, 2014  
INVENTOR(S) : Szabo et al.

Page 1 of 1

It is certified that error appears in the above-identified patent and that said Letters Patent is hereby corrected as shown below:

On the Title Page, Item (75), under "Inventors", in Column 1, Line 1, delete "Kecskement" and insert -- Kecskemét --, therefor.

Signed and Sealed this  
Tenth Day of March, 2015

Michelle K. Lee  
*Deputy Director of the United States Patent and Trademark Office*